United States Patent [19]

Isobe

[11] Patent Number: 4,843,543
[45] Date of Patent: Jun. 27, 1989

[54] STORAGE CONTROL METHOD AND APPARATUS

[75] Inventor: Tadaaki Isobe, Hadano, Japan

[73] Assignee: 501 Hitachi, Ltd., Tokyo, Japan

[21] Appl. No.: 40,931

[22] Filed: Apr. 21, 1987

[30] Foreign Application Priority Data

Apr. 25, 1986 [JP] Japan .................................. 61-96560

[51] Int. Cl.[4] ............................................. G06F 13/16
[52] U.S. Cl. ..................................................... 364/200
[58] Field of Search ................. 364/200, 900 MS File

[56] References Cited

U.S. PATENT DOCUMENTS

| 3,626,427 | 12/1971 | MacSorley et al. | 364/200 |
| 3,699,530 | 10/1972 | Capowski et al. | 364/200 |
| 4,325,120 | 4/1982 | Colley et al. | 364/200 |
| 4,661,900 | 4/1981 | Chen et al. | 364/200 |

FOREIGN PATENT DOCUMENTS 60-136849 of 0000 Japan ........................ G06F 13/16

Primary Examiner—Gary V. Harkcom
Assistant Examiner—Christopher H. Lynt
Attorney, Agent, or Firm—Kenyon & Kenyon

[57] ABSTRACT

A storage control device is connected between a number of access request control units and a storage device including a number of memory units. The apparatus includes a number of transmission units, each corresponding to one of the access request control unit. Each transmission unit receives access requests from its associated access request control unit and divides the access requests into a number of groups in the order of issuance from the access request control units. The transmission units also add access request identifiers to the access requests in each group and transmit a number of access requests with access request identifiers to a number of access request deciders. Each access request decider is associated with one of the independently accessible memory units. Each decider receives the access requests directed to its associated memory unit and serially supplies the requests to that memory unit. Additionally, a detection unit is connected to all of the access request deciders in order to detect that all access requests having the same access request identifier, as assigned by the identifier transmission units, have been transmitted from the access request deciders to the corresponding memory units.

10 Claims, 5 Drawing Sheets

F I G. 5
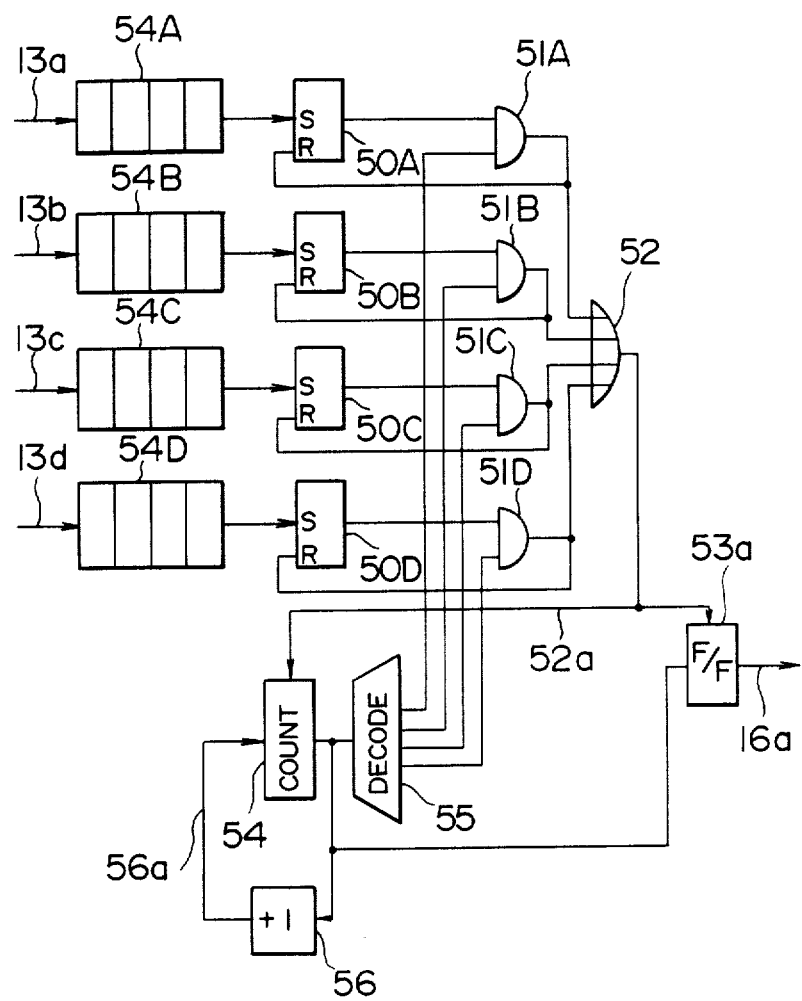

STORAGE CONTROL METHOD AND APPARATUS

BACKGROUND OF THE INVENTION

This invention relates to storage control method and apparatus for a computer system, especially, being suitable for operating a plurality of access request control units synchronously in parallel and ensuring the sequence or order between access requests which are sequentially issued to a storage area.

In conventional storage controlling, access requests are issued from a plurality of access request control units to a storage comprised of a plurality of independently accessible memory units (memory banks) as will be described below with reference to FIG. 1.

Referring to FIG. 1, access request control units 20A to 20D are sources for issuing access requests. Access request stack units 21A to 21D respectively stack access requests issued from each of the access request control units 20A to 20D. Each of the stack units sends a stacked access request in the order of stacking, to one of access request priority deciders 22A to 22D in accordance with address information contained in that access request. A storage area 23 is comprised of memory banks 23A to 23D.

Taking the access request control unit 20A, for instance, access requests issued from the unit 20A are stacked in a stack circuit 211 of the access request stack unit 21A and under the direction of a control circuit 210, a stacked access request is sent to one of the access request priority deciders 22A to 22D corresponding to one memory bank which is designated by an address contained in that access request. Each access request priority decider 22A, 22B, 22C or 22D selects one of the access requests sent from the access request stack units 21A to 21D and sends a selected access request to the storage area 23. The selection may be accomplished pursuant to priority grading which is predetermined among the access requests. The priority grading may be changed desirably to treat the access requests from the access request stack units as equally as possible. For example, the access request stack units 21A to 21D may be graded in the order of 21A, 21B, 21C and 21D for the initial concurrent access cycle, in the order of 21B, 21C, 21D and 21A for the next concurrent access cycle and in the order of 21C, 21D, 21A and 21B for the concurrent access cycle after next.

In another example, the order of 21A, 21B, 21C and 21D and the order of 21D, 21C, 21B and 21A may be repeated alternately for the purpose of the equal treatment.

It is thus regulated that a plurality of access requests be applied to one decider, for example, 22A at a time and access requests be sent serially one by one from the decider to one memory bank, for example, 23A.

Taking the access request priority decider 22A, for instance, a priority decision logic 220 checks and decides the access requests sent from the access request stack units 21A to 21D to the decider 22A for their priority and transmits a selected one of the access requests to the memory bank 23A of the storage 23. The other access requests not selected at that time are urged to wait at the entrance to the priority decision logic 220.

The access requests are transmitted from the access request control unit 20A until the stack 211 of the access request stack unit 21A fills up. When a control circuit 221 of, for example, the decider 22A transmits a signal 213 indicative of the fact that an access request 212 issued during the preceding machine cycle (a periodical predetermined interval of time during which a group of sequential circuits constituting the system operate synchronously) is selected by the logic 220 and the stack unit 21A receives the signal 213, the succeeding access request 212 is sent from the stack unit 21A. This warrants that in the order of the access requests issued from the access request control unit 20A, accessed data elements can be read out of the storage 23.

In addition to the prior art storage control apparatus described above, another storage control apparatus has been proposed as disclosed in JP-A-No. 60-136849, according to which with a view to improve the performance of the entire system, access requests to be issued from an access request control unit are divided, in the order of issuance, into groups each having a access requests (a is an integer) in unit whereby a access requests in each group are respectively added with access request identifiers 0 to (a−1) and then are issued from the access request control unit, and an access request priority decider directly coupled to a memory unit selects an access request and returns an access request identifier for the selected access request to the access request control unit which is an originator.

Incidentally, a vector processor for fast processing of a scientific computation comprises a plurality of vector registers for holding vector data, a plurality of arithmetic units for operating on the data, and a plurality of access request control units for data transfer between a storage and each of the vector registers, whereby vector elements in one vector instruction are concurrently allocated to a plurality of resources, such as vector registers, arithmetic units or access request control units, and are processed in parallel. Such parallel processing is a so-called element parallel processing mode and has been employed frequently in vector processors.

Generally speaking, it is desirable that the resources in the same group operating concurrently in the element parallel processing mode by completely synchronized with each other to process the allocated elements. By the complete synchronization, a control circuit can be used in common for the plurality of resources in the same group operating in parallel, thereby simplifying the control logic. In this approach, there arises however a problem that a waiting time takes place owing to competition for accessing to memory bank constituting the storage. Accordingly, in order for the plurality of resources in the same group to operate synchronously with each other, the advent of a storage control apparatus is desired which can absorb asynchonism occurring between the resources on account of the waiting time to thereby completely synchronize the storage accessing.

Reviewing then the prior art storage control apparatus disclosed in JP-A-No. 60-136849 mentioned previously, it will be seen that this prior art apparatus presupposes the fact that one access instruction is processed by allocating it to a single access request control unit and fails to take into consideration a processing in which data elements treated by one vector access instruction are divided for allotment to a plurality of access request control units with the aim of being processed in parallel, thus resulting in the problem that the plurality of access request control units to be operated in parallel can not be synchronized with each other so as to process access requests.

SUMMARY OF THE INVENTION

An object of this invention is to provide a storage controller capable of synchronizing a plurality of access request control units with each other to enable the plural access request control units to issue access requests every clock pitch, in a vector processor or the like in which vector data elements treated by one vector access instruction are divided for allocation to the plurality of access request units and they are then processed.

Another object of this invention is to provide an element parallel process capable of completely suppressing, within a storage controller, asynchronism in access request processing time due to storage accessing which mainly causes disturbance of the synchronous operation for data elements.

Another object of this invention is to provide storage control apparatus and method capable of receiving access requests, issued concurrently from a plurality of access request control units, every clock pitch to greatly improve ability to process the access requests by synchronizing them with each other.

Still another object of this invention is to provide a storage control apparatus and method, based on an element parallel processing mode in which vector elements treated by one vector access instruction and divided for allocation to a plurality of access request control units with the aim of being processed at a time, which can divide access requests issued from the plurality of access request control units into groups each having a access requests in unit and can exchange the order of issuance of the a access requests in unit to a storage while warranting the sequence of read vector data elements.

To accomplish the above objects, according to the invention, access requests issued from a plurality of access request control units are added with access request identifiers, signals are produced when it is detected that access requests with the same access request identifier issued from a plurality of access control units adapted to process one access instruction are all selected by a plurality of access request priority deciders, and the detection signals are used to permit issuance of the succeeding access requests with the same access request identifier, while a plurality of read data elements corresponding to the identifiers are transmitted concurrently to the access request originators after expiration of a fixed time required for the detection signals to access a storage.

Especially where the access operation to a series of elements of vector-like data is processed by dividing the vector data elements for allocation to a plurality of access request control units, access requests to be issued from respective access request control units are divided, in the order of request issuance, into groups each having a access requests in unit and the a access requests in each group are respectively added with access request identifiers 0 to (a−1), while a plurality of access request priority deciders respectively coupled to memory units select all access requests with the same access request identifer issued from the plurality of access request control units adapted to division process one access instruction and return the access identifiers for the selected access requests to the plurality of access request control units which are originators. This ensures that each of the plurality of access request control units for division processing one instruction can perform sequential issuance of at least a access requests regardless of whether the a access requests are selected by the access request priority deciders. Further, when access requests (with identifiers "0") issued, during the first issue cycle, from the plurality of access request control units adapted to division process one instruction are all selected by the deciders and the signals to this effect are then returned to the access request control units, the access request control units are allowed to issue access requests with identifiers "0" for the second issue cycle following issuance of access requests with the previous identifiers "a−1" for the first issue cycle. The succeeding issue cycles are taken care of in a similar way so that the access request control units for division processing one instruction can be synchronized with each other to sequentially issue access requests.

In a read data controller for transmitting read data elements corresponding to access requests to the corresponding access request originators, identifiers attendant on read data elements are recognized and data elements are stored in buffer positions corresponding to the identifiers. When a fixed time (access time of the storage) expires following detecting that all of the access requests with the same identifier issued from the plurality of access request control units adapted to division process one instruction are transmitted to the storage, that is, at the time that data elements of the same identifier are all stored in the read data buffers, the data elements stored in the buffers are transmitted synchronously in parallel, in the order to identifiers, to the data originators. This ensures that a plurality of read data elements corresponding to access requests issued from the plurality of access request control units adapted to division process one instruction can be transmitted while warranting the sequence of the read data elements.

BRIEF DESCRIPTION OF THE DRAWINGS

FIG. 5 is a circuit diagram showing an embodiment of a read data transmission control circuit shown in FIG. 3.

DESCRIPTION OF THE PREFERRED EMBODIMENTS

The invention will now be described by way of example with reference to the accompanying drawings.

Figure 1:
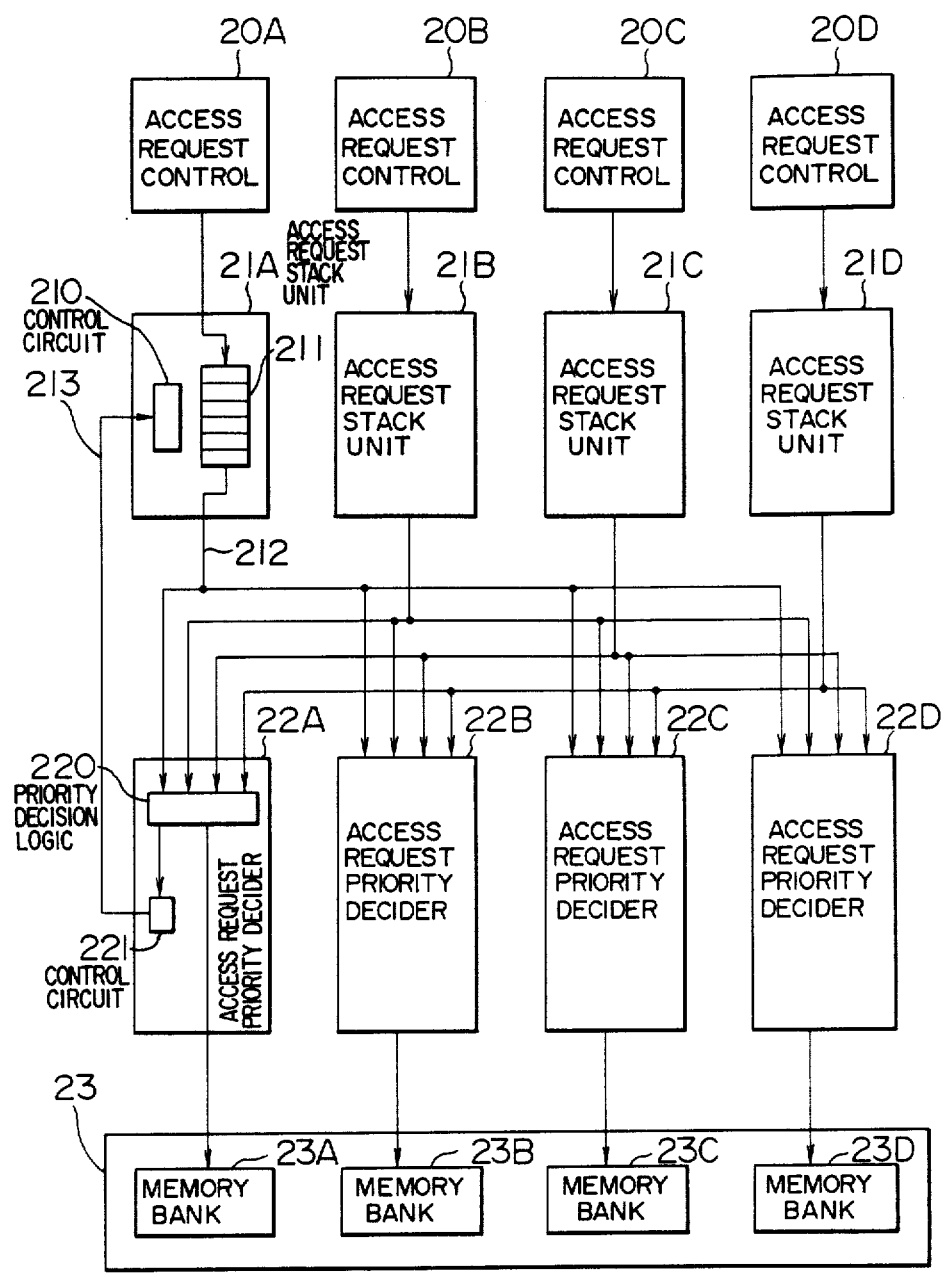
FIG. 1 is a block diagram showing a prior art storage control apparatus.
Figure 2:
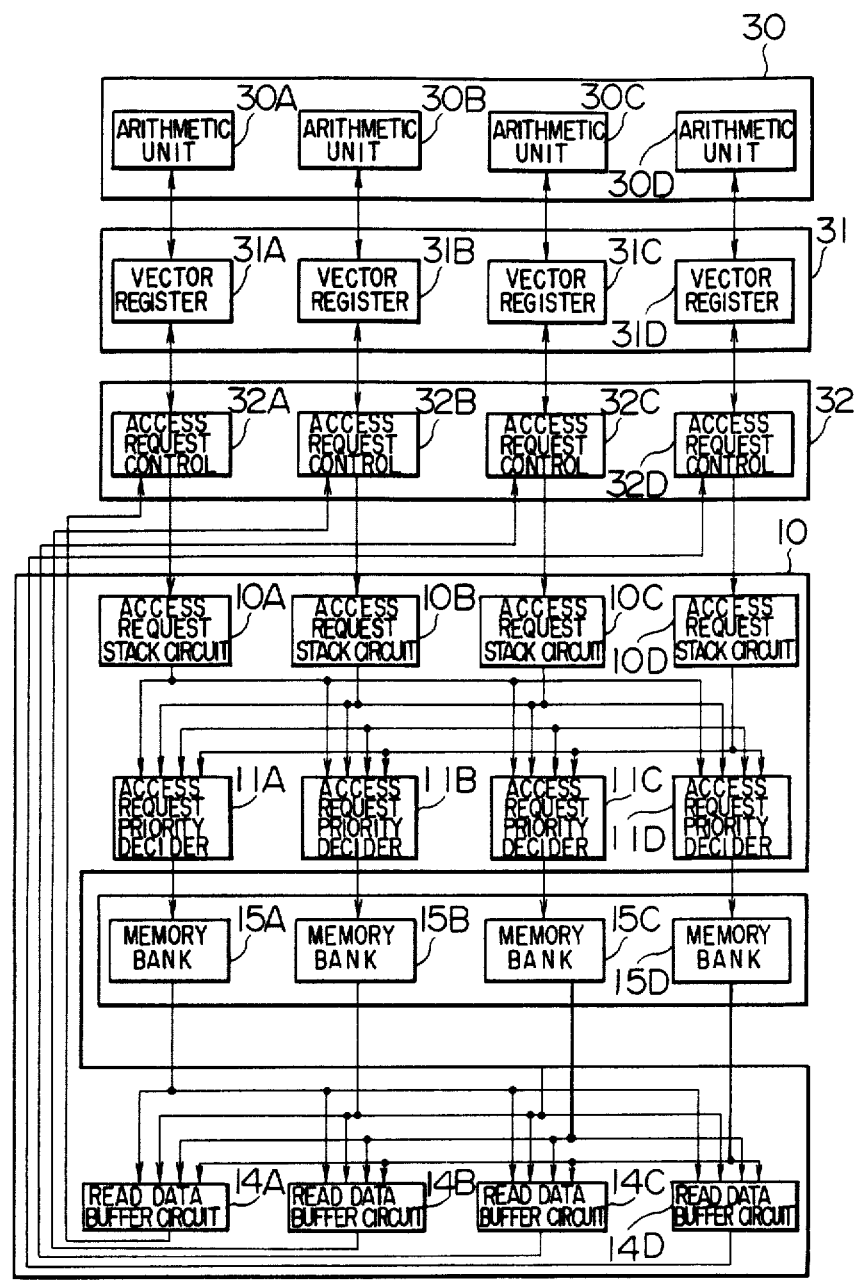
FIG. 2 is a block diagram showing the essential part of a computer system employing a storage controller according to the invention.

FIG. 2 illustrates, in block form, an exemplary construction of the essential part of a computer system incorporating an embodiment of the invention. The computer system comprises an arithmetic section 30 including a plurality of (four in this embodiment) arithmetic units 30A to 30D, a vector register section 31 including vector registers 31A to 31D and adapted to serve as a data buffer between the arithmetic section 30 and a storage 15, an access request controller 32 including access request control units 32A to 32D, and a storage controller 10. The storage 15 includes a plurality of (four in this embodiment) independently accessible memory banks 15A to 15D. Address information attendant on an access request is decoded to determine which memory bank should be accessed. The storage controller 10 includes access request stack circuits 10A to 10D in association with the access request control units 32A to 32D, read data buffer circuits 14A to 14D, and access request priority deciders 11A to 11D in association with the memory banks 15A to 15D.

The operation of the computer system shown in FIG. 2 will be described below by referring to, as an example, a storage read operation based on the element parallel processing mode.

Firstly, when reading a piece of vector data from the storage and storing the vector data in the vector register unit 31, vector elements are allocated to the access request control units 32A to 32D in the following manner and access requests are generated.

Access request

Control Units

32A: 0th, 4th, 8th, ... 4nth elements
32B: 1st, 5th, 9th, ... $(4n+1)$th elements
32C: 2nd, 6th, 10th, ... $(4n+2)$th elements
32D: 3rd, 7th, 11th, ... $(4n+3)$th elements (n being positive integer)

Access requests concurrently generated for four elements (for example, the 0th, 1st, 2nd and 3rd elements) are respectively sent to the corresponding access request stack circuits 10A to 10D. In accordance with an address contained in an access request, each stack circuit sends that access request to one of the priority deciders 11A to 11D. If a plurality of access requests compete with one another in either of the priority deciders, that priority decider selects one access request pursuant to predetermined priority grading and then sends the selected access request to corresponding one of the memory banks 15A to 15D. The read data corresponding to the access requests sent to the memory banks are read and transferred to the storage controller 10 after expiration of a fixed time (corresponding to an access time), so that elements of the read data representative of the vector elements are set to the read data buffer circuits 14A to 14D corresponding to the access request control circuits 32A to 32D. When all the data elements corresponding to the four access requests concurrently issued from the access request control circuits 32A to 32D are read out of the storage 15, these read data elements are sent to the access request control units. This data group is sent in the order of the concurrent issuance and then stored concurrently in the vector registers 31A and 31D. Allocation of the vector elements to the vector register unit 31 is as follows.

Vector registers

31A: 0th, 4th, 8th, ... 4nth elements
31B: 1st, 5th, 9th, ... $(4n+1)$th elements
31C: 2nd, 6th, 10th, ... $(4n+2)$th elements
31D: 3rd, 7th, 11th, ... $(4n+3)$th elements For arithmetic operation of the data stored in the vector registers 31A to 31D, the vector elements are allocated to the arithmetic units 30A to 30D in the following manner and operation results are again stored in the vector registers.

Arithmetic units

30A: 0th, 4th, 8th, ... 4nth elements
30B: 1st, 5th, 9th, ... $(4n+1)$th elements
30C: 2nd, 6th, 10th, ... $(4n+2)$th elements
30D: 3rd, 7th, 11th, ... $(4n+3)$th elements In the above arithmetic operation, the four arithmetic units 30A to 30D are completely synchronized with each other for operation. For example, results for the 0th, 1st, 2nd and 3rd elements are obtained concurrently and stored in the vector registers 31A to 31D.

When writing the data stored in the vector registers 31A to 31D into the storage 15, the vector elements are allocated to the access request control units 32A to 32D as in the case of data read previously described and four elements, for example, the 0th, 1st, 2nd and 3rd elements are sent to the corresponding access request stack circuits 10A to 10D. Thereafter, access requests are sent to the storage 15 similarly to the read operation.

As described above, the four arithmetic units 30A to 30D are synchronized with each other, the four vector registers 31A to 31D are synchronized with each other and the four access request control units 32A to 32D are synchronized with each other, so as to process the vector elements. Accordingly, the element parallel processing mode based on synchronous operation is permitted to take a logical construction which uses a single control system logic to control a set of the four arithmetic units 30A to 30D, a set of the four vector registers 31A to 31D and a set of the four access request control units 32A to 32D.

Within the storage controller 10, however, the four access requests concurrently issued from the access request control units 32A to 32D operating in synchronism are not always processed concurrently because of a condition of an accessed memory bank (for example, the memory bank being occupied by the preceding access request) and competition with another access and as a result, the access results are sent to the memory banks at different times. Accordingly, a control system is needed wherein the read data buffer circuits 14A to 14D of the storage controller 10 wait until the read data elements corresponding to the access requests concurrently sent from the access request control units 32A to 32D are all stored in the buffers 14A to 14D and when all the data elements are stored, the data elements are sent to the four read data access request control units 32A to 32D at a time.

A synchronous control mode in the storage controller will now be described in greater detail with reference to FIG. 3.

Figure 3:
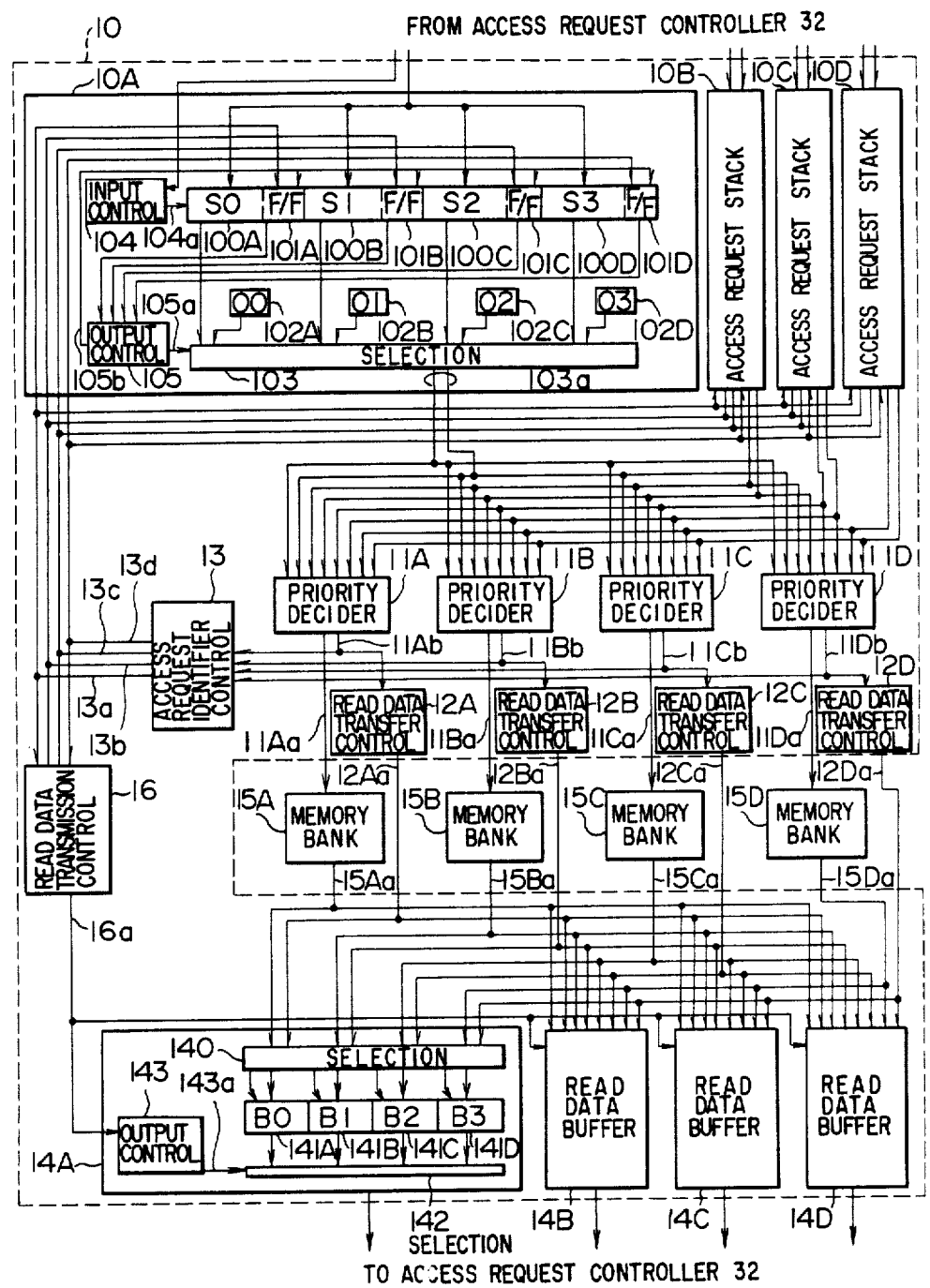
FIG. 3 is a circuit diagram showing a storage controller according to an embodiment of the invention.

The construction of the storage controller 10 of FIG. 2 is exemplarily detailed in FIG. 3, along with connection to the memory banks 15A to 15D. In addition to the access request stack circuits 10A to 10D, priority deciders 11A to 11D and read data buffer circuits 14A to 14D, the storage controller 10 comprises read data transfer control circuits 12A to 12D and an access request identifier control circuit 13.

Four access requests for, for example, the 0th, 1st, 2nd and 3rd elements issued concurrently from the access request control units 32A to 32D arrive at the access request stack circuits 10A to 10D, respectively. The access request reaching the access request stack circuit 10A, for example, is set in one of stacks S0 (100A), S2 (100B), S2 (100C) and S3 (100D), for example, the stack S0 (100A) which is designated by an input control circuit 104. The input control circuit 104 designates one of the stacks by sending thereto a signal 104a indicative of one of stack positions "0" to "3" (corresponding to the stacks S0 to S3) to which one access request is to be stored. The indication of the signal 104a changes to circulate through "0"→"1"→"2"→"3"→"0" ... each time that one access request is stored in one stack, thereby designating a subsequent store stack position.

Each access request stored in one of the stacks S0 to S3 of each of the access request stack circuits 10A to 10D is sent to the priority deciders 11A to 11D through a selection circuit 103 under the control of an output control circuit 105. For example, when the output control circuit 105 designates the stack position or number "0" representative of the stack S0 (100A), an access request stored in the stack S0 (100A) is delivered. Like the input control circuit 104, the output control circuit 105 designates one of the stacks by sending to the selection circuit 103 a signal 105a indicative of one of stack positions "0" to "3" from which one access request is to be delivered. The indication of the signal 105a changes to circulate through "0"→"1"→"2"→"3"→"0" . . . each time that one access request is delivered to the selection circuit 103. However, the output control circuit 105 is different from the input control circuit 104 in that it controls the delivery of the access request from the designated stack dependent on contents of access request transmission control flip-flops 101A to 101D associated with the stacks S0 to S3, respectively.

More particularly, when the output control circuit 105 accesses, for example, the access request transmission control flip-flop 101A associated with the stack S0 (100A) and the content of the flip-flop 101A is "1", an access request stored in the stack S0 (100A) is delivered to the priority deciders 11A to 11D. Contrarily, when the content of the flip-flop 11A is "0", the delivery of the access request from the stack S0 (100A) is inhibited until the flip-flop 101A is set to "1" by a signal 13a from the access request identifier control circuit 13 and at the same time, the stack number "0" indicated by the signal 105a delivered out of the output control circuit 105 is maintained.

Where the content of the flip-flop 101A is "1", after the access request stored in the associated stack S0 (100A) has been fetched and delivered to the priority deciders 11A to 11D, the output control circuit 105 resets the flip-flop 101A to "0" by sending thereto a signal 105b representative of information about completion of that delivery. Then, the output control circuit 105 is ready to access the subsequent stack S1.

Taking the access request stack circuit 10A, for instance, an access request 103a sent from the selection circuit 103 to the priority deciders 11A to 11D contains, in addition to address information stored in for example the stack S0 (100A), one of access request identifiers of two digits "00", "01", "02" and "03" delivered out of access request identifier generators 102A to 102D, the first digit "0" of the access request identifier being indicative of the access request stack circuit 10A in question and the second digit "0", "1", "2" or "3" being the stack number designating the stack S0, S1, S2 or S3. In this example, the access request identifier "00" is designated.

Although the access request stack circuit 10A has been described as an example, each of the remaining stack circuits 10B to 10D operates similarly to the stack circuit 10A. Thus, four access requests issued concurrently from the four access request control units are stored and processed in the corresponding stacks of the same number of respective stack circuits.

The access request 103a sent from the access request stack circuit 10A can reach one of the priority deciders 11A to 11D in association with the memory banks, for example, the decider 11A in accordance with an access address designated by that access request. The access request 103a reaching the priority decider 11A is checked for its priority in relation to another access request sent from the remaining access request stack circuit 10B, 10C or 10D and if selected, an access request 11Aa is sent to the corresponding memory bank 15A, together with information indicative of either read or write mode, an address on the memory and data in the case of write mode.

Figure 4:
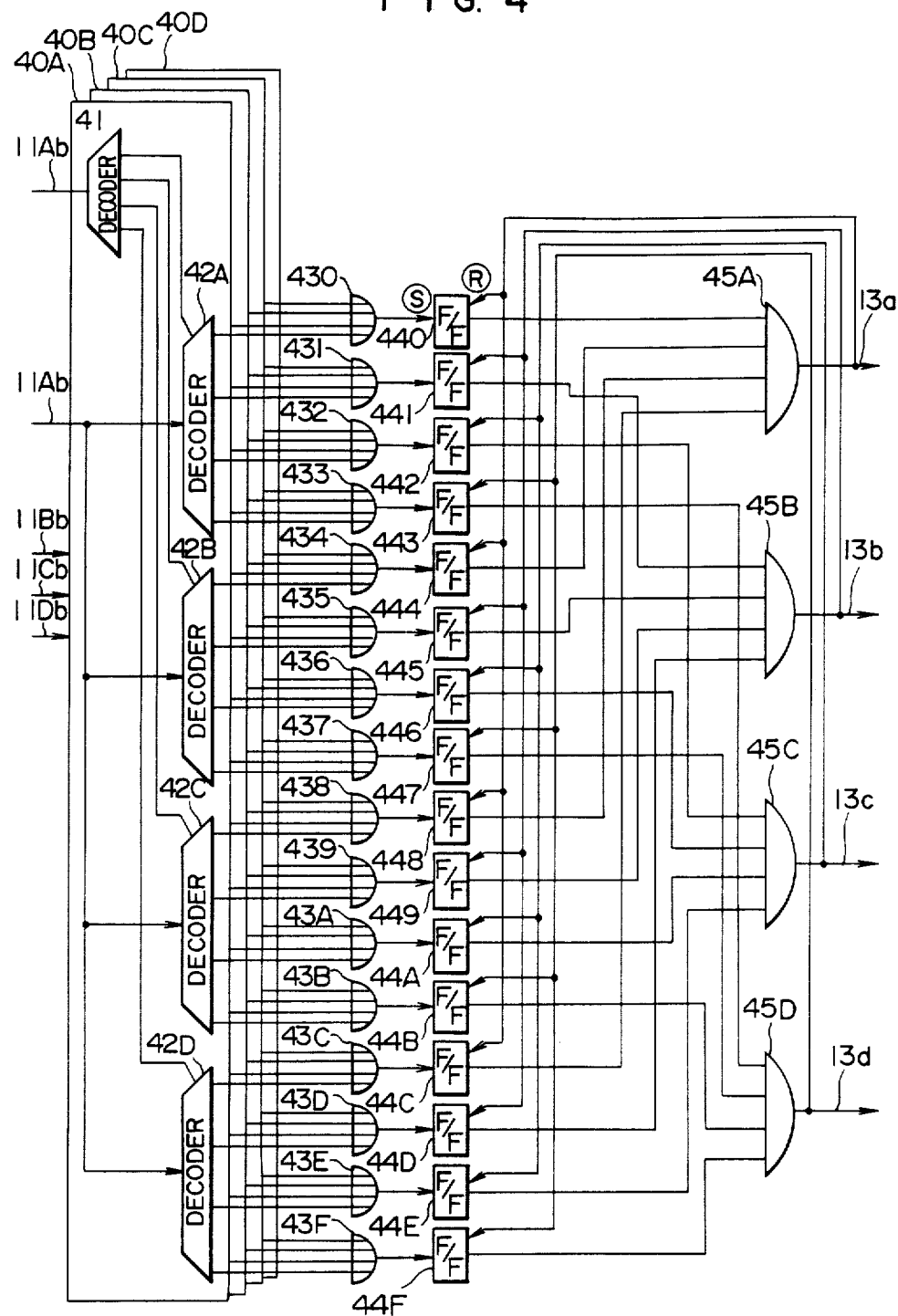
FIG. 4 is a circuit diagram showing an embodiment of an access request identifier control circuit shown in FIG. 3.

Concurrently with the delivery of the access request 11Aa, an access request identifier 11Ab is sent to the access request identifier control circuit 13. Details of the access request identifier control circuit 13 are illustrated in FIG. 4. Referring to FIG. 4, the access request identifier 11Ab is supplied to a decoder circuit 40A which includes a decoder 41 for decoding a number representative of the access request stack circuit 10A, 10B, 10C or 10D and decoders 42A to 42D for decoding a stack number in each circuit 10A, 10B, 10C or 10D and which is operative to specify the access request stack circuit and the stack number. Signals from the decoder circuit 40A are passed through OR gates 430 to 43F so as to set to "1" one of flip-flops 440 to 44F which are adapted to indicate validity of access request identifier for each access request stack circuit specified by the decoder circuit. Similarly, access request identifiers 11Bb to 11Db are decoded by decoder circuits 40B to 40D and used to set specified flip-flop for indication of validity of access request identifier.

When the flip-flop corresponding to the stacks of the same number in respective access request stack circuits 10A to 10D, for example, the flip-flops 440, 444, 448 and 44C are all rendered "1", indicating that the four access requests reaching the access request stack circuits 10A to 10D at a time and set in the stacks S0 in respective stack circuits are all sent to the storage 15, all of the "1" signals are detected by an AND gate 45A (similar AND gates 45B to 45D are provided) to produce the signal 13a which sets to "1" the contents of the access request transmission control flip-flops 101A associated with the stacks S0 in respective access request stack circuits 10A to 10D. This ensured that the subsequent access requests stored in the stacks S0 in respective access request stack circuits 10A to 10D are ready for transmission to the priority deciders 11A to 11D. At the time the signal 13a is sent to the access request stack circuits 10A to 10D, the validity indication flip-flops 440, 444, 448 and 44C producing the signal 13a are reset to "0".

Incidentally, read data elements 15Aa to 15Da corresponding to the access requests 11Aa to 11Da sent to the memory banks 15A to 15D are transferred to the read data buffer circuits 14A to 14D, together with access request identifiers 12Aa to 12Da retarded at the read data transfer control circuits 12A to 12D by an access time of the memory banks and the stack numbers. On the basis of a stack number and an access request stack circuit number designated by the access request identifier, each of the read data buffer circuits 14A to 14D stores, under the direction of a selection circuit 140, one of the read data elements into one of data buffers B0 (141A) to B3 (141D) of each of the read data buffer circuits 14A to 14D respectively corresponding to the access request stack circuits 10A to 10D, the data buffers being provided in correspondence to the stacks S0 to S3 of each of the access request stack circuits 10A to 10D. For example, the identifier 12Aa indicative of "00" serves to store the read data element 15Aa in the data buffer B0 (141A) of the read data buffer circuit 14A. In the event that the number of access requests designated by an access instruction is too small to occupy all of the memory banks, some of the access requests 11Aa to 11Da sent to unoccupied memory banks are added with non-operation codes to thereby complete the access instruction.

Incidentally, a read data transmission control circuit 16 operates independently of the storage of the read data elements to the data buffer circuits to concurrently transmit the four read data elements sorted in the read data buffer circuits 14A to 14D to the access request control circuits 32A to 32D. FIG. 5 illustrates details of the read data transmission control circuit 16.

Sent to the read data transmission control circuit 16 are the signals 13a to 13d from the access request identifier control circuit 13 respectively indicating that access requests stored in the stacks of the same number in respective four access request stack circuits 10A to 10D are all transferred to the memory banks. Each of the signals 13a to 13d indicates, in other words, that read data elements are all stored in corresponding one of the four data buffers B0 (141A) to B3 (141D) in respective four read data buffer circuits 14A to 14D after expiration of a fixed time (corresponding to the access time of each memory bank). Accordingly, validity of the read data elements in corresponding one of the data buffers B0 (141A) to B3 (141D) in respective read data buffer circuits 14A to 14D can be indicated by passing the signals 13a to 13d through buffers 54A to 54D which delay these signals to match with the memory bank accessing so as to set flip-flop 50A to 50D.

The read data transmission control circuit 16 is operative to sent to the read data buffer circuits 14A to 14D a control signal 16a which controls sequential delivery of the valid data elements from the read data buffers, beginning with the data buffer B0 (141A) followed by the data buffers B1 (141B), B2 (141C) and B3 (141D). But when the content of a flip-flop for indication of read data validity 50A, 50B, 50C or 50D corresponding to a data buffer designated by the content of read data pickup pointer 54 which is decoded by a decoder 55 is "0", that is, when a read data element corresponding to at least one of four access requests which is stored in a stack within the access request stack circuits 10A to 10D, the position of that stack being designated by the pointer 54, has not reached the read data buffer yet, the delivery of the read control signal 16a is inhibited by AND gates 51A to 51D and the content of the pointer 54 also remains unchanged until that flip-flops 50A, 50B, 50C and 50D are set to "1". Subsequently, when the content of the flip-flop for indication of read data validity corresponding to the data buffer designated by the pointer 54 changes to "1", this change is detected by the AND gates 51A to 51D and an OR gate 52, thereby, enabling the read control signal 16a to be transmitted through a flipflop 53A. Concurrently therewith, a signal 52a resets the read data validity indication flip-flop designated by the pointer 54 to "0" and the content of the pointer 54 is renewed by being added with "+1" from a +1 circuit 56.

The four read data buffer circuits 14A to 14D receive the read control signal 16a simultaneously so that the read control signal 16a is applied to an output control circuit 143 provided in each circuit 14A, 14B, 14C or 14D. The output control circuit 143 then issues a signal 143a which controls a selection circuit 142 such that a read data element stored in a data buffer whose number or position is designated by the read control signal 16a can be picked up.

Through the operation described above, four read data elements can be transmitted synchronously in parallel from the four read data buffer circuits 14A to 14D to the access request control units 32A to 32D.

As has been described, according to the present embodiment, of four access requests issued concurrently and synchronously from the four access request control units 32A to 32D, a maximum of three access requests can be overridden within the storage controller 10 so that the four access requests can be processed every clock pitch, and besides read data elements corresponding to the four access requests received at a time can be sent to the access request control units 32A to 32D in the order of the synchronous, parallel receipt of the access requests.

I claim:

1. A storage control apparatus, connected between a storage device, said storage device including a plurality of independently accessible memory units, and a plurality of access request control units, each of said plurality of access request control units being operative to issue, to said storage device, access requests corresponding to elements of data, said storage control apparatus sequentially transmitting selected ones of said access requests issued from said plurality of access request control units to corresponding memory units designated by said access requests, said storage control apparatus comprising:

a plurality of identifier transmission means for dividing said access requests issued from said plurality of access request control units into a plurality of groups based on the order of issuance from said access request control units wherein each identifier transmission means is associated with one of said access request units and divides said access requests from said associated access request unit, and wherein each identifier transmission means further adds access requests in each group with access request identifiers, and wherein each identifier transmission means further transmits a plurality of access requests with access request identifiers added thereto;

a plurality of access request decider means, each access request decider means being provided in correspondence to one of said plurality of memory units, for receiving the plurality of access requests with access request identifiers sent from said identifier transmission means and serially supplying to the corresponding memory units the received access requests one by one; and means, connected to said plurality of access request decider means, for detecting that all access requests with the same access request identifier have been transmitted from said plurality of access request decider means to said corresponding memory units, said means for detecting further sending to all of said identifier transmission means information indicative of the detection that all access requests with the same access request identifier have been transmitted from said plurality of access request decider means to said corresponding memory units which permits said same access request identifier to be used for new access requests.

2. The storage control apparatus of claim 1 further comprising:

a plurality of buffer means, each one of said buffer means being associated with one of said plurality of memory units, for holding respective data elements read out of respective memory units; and means, receiving from said plurality of identifier transmission means signals indicative of the fact that all of the access requests having the same access request identifier have been detected, for informing said plurality of buffer means of said detection indicative signals so as to permit said read data elements held in said plurality of buffer means to be transmitted to said plurality of access request control units.

3. The storage control apparatus of claim 2 wherein said each identifier transmission means comprises a stack for access requests for said data elements received from said associated access request control unit, and a plurality of flip-flops associated with each stack for controlling whether the access requests held in said stacks are permitted to be transmitted to said access request decider means, and wherein said plurality of buffer means each have a plurality of buffer positions for holding said data elements, and wherein each said stack is partitioned into a number of portions wherein said number of portions correspond to the number of access request identifiers, each portion corresponding to one of said identifiers, each one of said plurality of flip-flops being associated with one of said portions of said stacks and each buffer position being associated with one of said access request identifiers.

4. The storage control apparatus of claim 1 wherein each said access request decider means is coupled to all of said plurality of identifier transmission means and wherein each said access request decider means comprises priority means for serially delivering a plurality of access requests that are competing with each other to said memory units in accordance with a predetermined priority value.

5. The storage control apparatus of claim 4 wherein said priority means comprises means for sequentially changing the priority value at the rate of a predetermined number of data access operations.

6. The storage control apparatus of claim 2 further comprising means for sending, from respective access request decider means to respective buffer means, an access request identifier and an identification number, which identifier number identifies the identifier transmission means responsible for a given access request, in synchronization with a data element to be read out of the memory unit associated with said access request decider means wherein said data element is read out in response to said given access request.

7. The storage control apparatus of claim 6 wherein said means for informing comprises means for providing a plurality of signals, one associated with each of said buffer means, with a delay time corresponding to an interval of time within which data elements have been read out of respective memory units and then transferred to respective buffer means, said plurality of signals indicating that all access requests having the same request identifier have been sent to said memory units.

8. The storage control apparatus of claim 1 wherein said detecting means comprises, a plurality of latch means for latching a flag indicative of the validity of a detected identifier, the number of said latch means being equal to the product of the number of said identifier transmission means and the number of access request identifiers in each identifier transmission means, decoders connected to said plurality of latch means, for discriminating the identification of said identifier transmission means based on said identification number, and decoders for discriminating individuality of said access request identifiers.

9. A computer system comprising:

a storage device having a plurality of independently accessible memory units;

a plurality of access request control units operative to issue, to said storage device, access requests corresponding to elements of vector data;

a plurality of identifier transmission means, each identifier transmission means being associated with one of said plurality of access request control units, for dividing a plurality of access requests received from said access request control units into a plurality of groups based on the order of reception, wherein each said identifier transmission means transmits the plurality of access requests together with access request identifiers for identifying individuality of said access requests;

a plurality of access request decider means each associated with one of said memory units, for selectively receiving said access requests in accordance with addresses in said storage device and serially supplying to the corresponding one of said memory units the selected access requests one by one; and means, connected to the output of all of the plurality of access request decider means, for detecting that access requests with the same access request identifier have all been transmitted from said plurality of access request decider means to said address corresponding memory units in said storage.

10. A storage control method for controlling an access sequence to respective elements of vector data in an orderly manner in a computer system including a storage device, having a plurality of independently accessible memory units, and a plurality of access request issue units for issuing access requests to said storage device, said access requests corresponding to the vector data elements, said method comprising the steps of:

dividing the access requests corresponding to the elements into a plurality of groups based on the order of request issuance;

adding access requests in each group with access request identifiers which are common to respective groups;

receiving access requests with the same identifier sent to respective memory units and deciding whether all of the access requests with the same identifier have been sent to respective memory units; and allowing, when the access requests with the same identifier have been sent to respective memory units the use of the same identifier for new vector data elements.

* * * * *

UNITED STATES PATENT AND TRADEMARK OFFICE
CERTIFICATE OF CORRECTION

PATENT NO. : 4,843,543

DATED : June 27, 1989

INVENTOR(S) : Isobe

It is certified that error appears in the above-identified patent and that said Letters Patent is hereby corrected as shown below:

Column 1, line 14 change "storage " to --storage area--; line 30 change "th." to --the--; line 62 change "storage 23." to --storage area 23.--.
Column 2, line 10 change "storage 23" to --storage area 23--;
line 41 change "by" to --be--.
Column 4, lines 64 and 66 change "storage 15" to --storage area 15--.
Column 5, line 30 change ".equest" to --request--.
Column 6, lines 5 and 11 change "storage 15" to --storage area 15--;
line 58 change "S2" (first occurrence) to --$S_1$--.
Column 7, line 30 change "\" to --is--;
line 36 change "assodiated" to --associated--.
Column 9, line 30 change "flip-flop" to --flip-flops--;
line 32 change "sent" to --send--;
line 48 change "that" to --the--.
Column 10, line 67 change "of.buffer" to --of buffer--.
Column 11, line 30 change "reques." to --request--.

UNITED STATES PATENT AND TRADEMARK OFFICE
CERTIFICATE OF CORRECTION

PATENT NO. : 4,843,543

DATED : June 27, 1989

INVENTOR(S) : Isobe

It is certified that error appears in the above-identified patent and that said Letters Patent is hereby corrected as shown below:

Column 12, line 39 change "sponding memory" to --sponding to memory--.

Signed and Sealed this

Twenty-sixth Day of June, 1990

Attest:

HARRY F. MANBECK, JR.

Attesting Officer

Commissioner of Patents and Trademarks